United States Patent [19]
Bair et al.

[11] Patent Number: 5,486,292
[45] Date of Patent: Jan. 23, 1996

[54] ADSORBENT BIOCATALYST POROUS BEADS

[75] Inventors: Thomas I. Bair, Wilmington, Del.; Carl E. Camp, Ponca City, Okla.

[73] Assignee: E. I. Du Pont de Nemours and Company, Wilmington, Del.

[21] Appl. No.: 205,689

[22] Filed: Mar. 3, 1994

[51] Int. Cl.$^6$ ........................................ C02F 3/10
[52] U.S. Cl. .................. 210/616; 210/618; 210/670; 210/679; 210/694; 210/150; 210/266; 210/267; 210/502.1; 435/182; 435/299.1
[58] Field of Search .................................. 210/150, 151, 210/615, 616, 617, 618, 670, 694, 679, 266, 269, 502.1; 435/288

[56] References Cited

U.S. PATENT DOCUMENTS

| | | | |
|---|---|---|---|
| 4,144,373 | 12/1976 | Weiss et al. | 428/306 |
| 4,427,548 | 1/1984 | Quick, Jr. | 210/617 |
| 4,551,250 | 11/1985 | Moyer et al. | 210/617 |
| 4,566,971 | 1/1986 | Reimann et al. | 210/616 |
| 4,576,718 | 3/1986 | Reischl et al. | 210/151 |
| 4,743,545 | 5/1988 | Torobin | 435/41 |
| 4,843,105 | 6/1989 | Reischl et al. | 210/610 |
| 4,876,287 | 11/1986 | Babcock et al. | 521/28 |

OTHER PUBLICATIONS

International Application WO 91/05859, Seidel, Don C. et al., May 2, 1991.

Primary Examiner—Christopher Upton

[57] ABSTRACT

Highly porous, adsorbent biocatalyst beads of synthetic organic polymer have powdered activated carbon dispersed throughout the polymer and a biocatalyst, such as bacteria, located within macropores of the beads. The beads are used for remediation of contaminated aqueous streams. The biocatalyst can consume adsorbed organic contaminants and convert them into harmless gases, while continuously renewing the adsorptive capacity of the activated carbon.

7 Claims, 1 Drawing Sheet

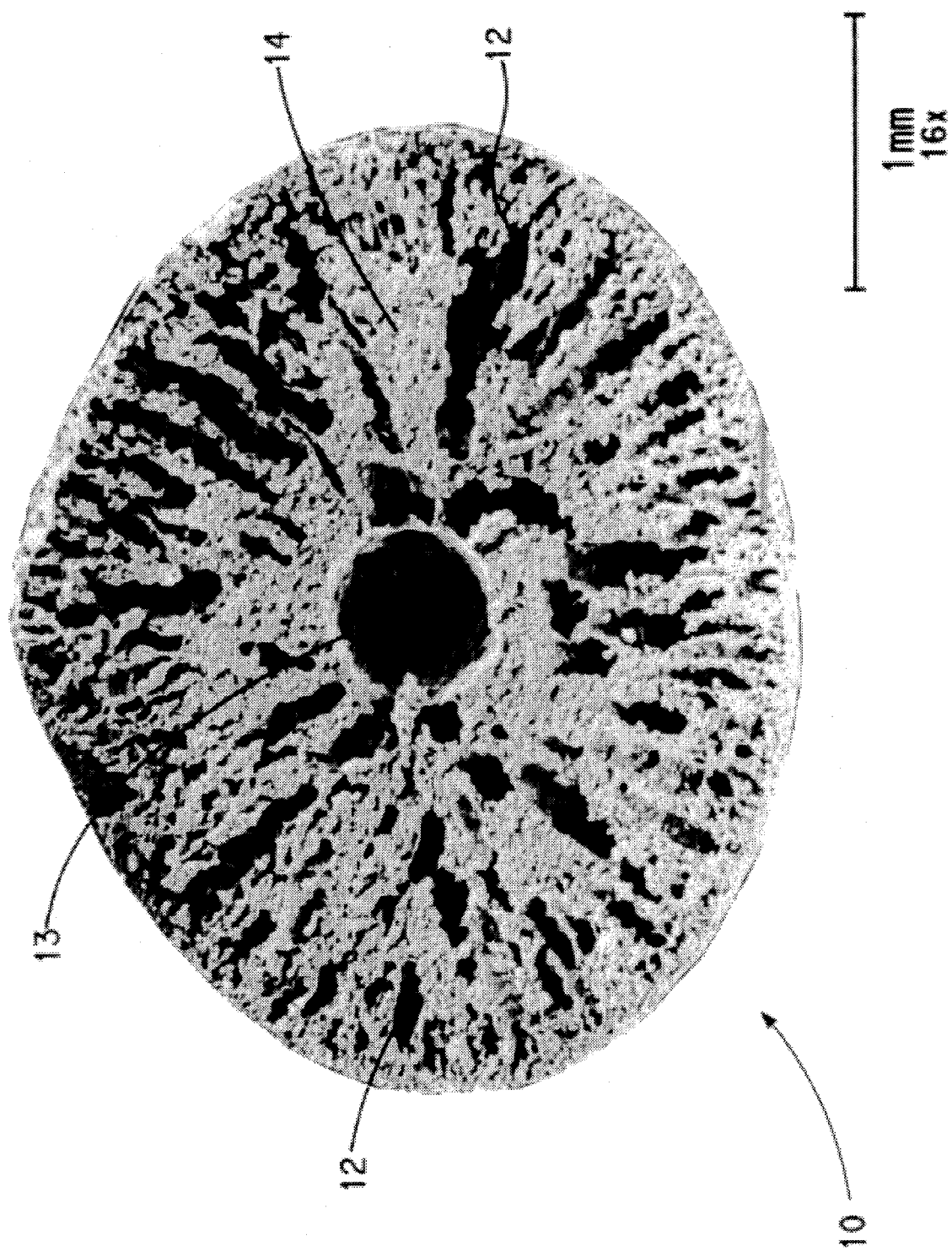

ADSORBENT BIOCATALYST POROUS BEADS

BACKGROUND OF THE INVENTION

1. Field of the Invention

This invention relates to porous polymeric beads that contain a biocatalytic material for use in separating small quantities of organic contaminants from solutions. More particularly, the invention concerns such porous polymeric beads that have finely divided particles of activated carbon dispersed within the polymer. The beads of the invention are particularly efficient in adsorbing potentially toxic organic chemicals from aqueous streams. The biocatalytic material, which is located within macropores of the polymer beads, can consume adsorbed organic contaminants and convert them into harmless gases, while continuously renewing the adsorptive capacity of the activated carbon.

2. Description of the Prior Art

The removal of contaminants from aqueous streams has been an important environmental concern for many years. Numerous methods have been employed to significantly decrease the concentrations of various metals and dissolved organic contaminants from such streams. It is well known that dissolved materials can be adsorbed from solution by particles that have suitable surfaces and then the process can be reversed to recover or dispose of the adsorbed material. A frequently used adsorbing material is granular activated carbon (sometimes referred to herein as "GAC"), which has been used as a slurry or fluidized bed. Powdered activated carbon also has been incorporated into biomass sludges to treat water. Advances are desired over these water-treatment techniques are needed, to achieve lower contaminant concentrations, especially in small streams that contain trace quantities of contaminants.

Various particulate materials have been disclosed for selectively adsorbing specific wanted or unwanted ingredients from aqueous and other streams. For Example, Torobin, U.S. Pat. No. 4,743,545, column 1, line 15, through column 3, line 4, which disclosure is hereby incorporated by reference, provides a review of such techniques. Torobin describes various bioreactors and defines "bioreactor" in its broadest sense, as a biocatalyst in a container and "biocatalyst", as one of a variety of chemically active living microorganisms, such as bacteria, yeast, and the like. Numerous known containers or supports for biocatalysts are described. These include: porous solids, porous organic and inorganic fibers, and microcapsules; solid beads, which may or may not be porous, on which microorganisms may be affixed or immobilized; and hollow semipermeable organic microcapsules, gelatinous microbeads and hollow semipermeable fibers that encapsulate biocatalysts. The bioreactors of Torobin have biocatalyst contained in rigid hollow microspheres. The microsphere wall is formed of sintered inorganic particles. The sintered particles form interconnected voids within the walls and thereby provide paths from the outside surface of the microsphere to the hollow central region in which the biocatalyst is contained. The biocatalyst is immobilized by a semipermeable membrane or gel in the pores or in the entrance to the pores of the wall of the hollow microsphere.

Weiss et al, U.S. Pat. No. 4,144,373 discloses fine porous beads of a composite material for use in separating small quantities of dissolved material from a solution. The composite material comprises a mixture of adsorbent particles, such as carbon among others, and optionally magnetic particles embedded in a porous matrix of a hydrophilic cross-linked organic polymer. The magnetic particles facilitate separation of the adsorbent from the liquid being treated. The porosity of the matrix is determined by the degree of cross-linking. Suitable polymeric matrices are hydrophilic polymers such as polyvinyl alcohol, cellulose, polyamides, and polyols, which are cross-linked with appropriate cross-linking agents.

Seidel et al, International Publication No. WO 91/05859, discloses the removal of metal contaminants from aqueous waste streams by contact with insoluble polymeric beads having an internal pore structure containing immobilized extractants. Polymers such as polysulfones and cellulose acetate, and extractants such as yeast, algae, mold, gums, and chemical compounds are disclosed. The beads are formed by dissolving the polymer in organic solvent, blending the desired biomass or chemical extractants into the polymer solution, and then injecting the resultant mixture into water to form spherical beads of about $1/16$- to $1/4$-inch (1.6–6.4 mm) diameter. The chemical extractants may be sorbed onto powdered activated carbon, as shown in Example 3 of the publication. The carbon serves, not as an extractant but as an aid in retaining the extractant within the finished bead.

U.S. Pat. No. 4,876,287, Babcock et al, discloses polymeric microporous anisotropic beads impregnated with complexing agents for selective removal of copper, zinc, and iron from plating solutions. The beads are prepared by injecting droplets of a solution of the polymer into a water bath where they are precipitated. Among the polymers disclosed for such use by Babcock et al are polysulfones, polyethylenes, polystyrenes, polyamides, and polymethacrylates. The beads are loaded with 20–90 vol % of the complexing agent after the beads are formed.

Each of the above-described known bead materials have some individual shortcomings, (e.g., such as excessive friability, difficulty in sealing the extractant in microcapsules or fibers, limited capacity, etc.). However, all the known bead materials are limited in how long the beads can remain actively effective in removing the desired material from a stream and in being capable of removing very low concentrations of such materials from the stream. Accordingly, it is an aim of this invention to provide a bioreactor in the form of polymeric beads that can remove low concentrations of contaminants from streams for long periods.

SUMMARY OF THE INVENTION

The present invention provides an improved bioreactor in which biocatalyst material is supported within porous synthetic organic polymeric beads. In accordance with the improvement of the invention, activated carbon powder is dispersed throughout the polymer of the bead and the biocatalyst material is located within macropores of the bead. Preferably the activated carbon powder amounts to 2.3 to 7 times the weight of the polymer. Typically, the bead has a a BET specific surface area (indicative of microporosity) of at least 400 square meters per gram, preferably in the range of 600 to 1600 m2/g and a mercury intrusion volume (indicative of macroporosity) in the range of 1.8 to 2.5 cubic centimeters per gram. The void volume of the bead is typically at least 40% of the total volume of the bead. Preferably, the biocatalyst is bacteria which typically are selected so that an organic chemical that is to be adsorbed by the activated carbon powder will be metabolized by the bacteria. Preferred polymers for the bead are selected from poly(m-phenylene isophthalamide) and copolymers thereof, and a polymer or copolymer formed from terephthalic acid, isophthalic acid, m-phenylene diamine and 2,4-diaminobenzene sulfonic acid.

The invention also includes a process for detoxification of an aqueous waste stream containing an organic chemical contaminant, comprising the steps of (a) passing the waste stream through bed of the bioreactors, (b) adsorbing the organic contaminant, onto the activated carbon powder particles of the bioreactor bead, (c) bacteria immobilized in the macropores of the bead being the biocatalyst and metabolizing the adsorbed chemical contaminant to water, carbon dioxide and/or nitrogen and thereby regenerating adsorbent capacity of the carbon powder, and (d) discharging from the bed of bioreactors, an aqueous stream that is substantially free of the contaminants.

BRIEF DESCRIPTION OF THE DRAWINGS

The invention will be better understood by referring to the attached drawings which is a magnified cross-sectional photograph of a typical porous bioreactor bead 10 of the invention having large pores 12 and central pore 13 wherein biocatalyst (e.g., bacteria) will be located within matrix 14 of polymer and highly dispersed fine activated carbon powder.

DETAILED DESCRIPTION OF PREFERRED EMBODIMENTS

The following descriptions of preferred embodiments of the invention are included for the purposes of illustration and are not intended to limit the scope of the invention, which is defined by the appended claims.

The improved bioreactor of the present invention is of the general type that has biocatalytic material located with the pores of porous synthetic organic polymer beads. In accordance with the improvement of the invention, activated carbon powder is dispersed throughout the porous polymer. The activated carbon powder weighs in the range of 2.3 to 7 times the weight of the organic polymer in which it is dispersed. The dispersed carbon powder provides within each bead a large amount of microporous material which has highly active adsorbent surfaces. Typically, the powdered carbon is of such a size that 100% of the powder passes a 65-mesh screen and 95% of the powder passes a 300 mesh screen.

As shown in the attached drawing, the carbon-containing polymeric beads 10 are formed in such a way that the beads also possess relatively large pores 12 and 13, which are referred to herein as "macropores". When the beads are inoculated with biocatalytic material such as bacteria, the biocatalytic material enters the large pores, grows therein, and becomes substantially immobilized within the macropores.

Typically, the total internal void volume of the beads amounts to at least 40% of the total volume of the bead. The large amount of microporosity of the beads, is indicated by its BET specific surface area of at least 400 m2/gram, preferably in the range of 600 to 1600 m2/g. The large amount of macroporosity is indicated by its mercury intrusion volume which is in the range of 1.8 to 2.5 cm3/gram. The median pore diameter is greater than about 1.5 microns (preferably somewhat greater than 2). Such pore sizes are highly suited for immobilization of bacteria which typically are between 0.5 to 2.0 microns in diameter. As can be seen from the attached magnified cross-sectional photograph of a bead micrograph, although the bead is a highly porous and has numerous small pores, large pores of about 300 to 400 microns in size are also present; such macropores are highly suited for colonization by bacteria.

The activated-carbon-containing polymeric beads can be in various geometric shapes including spheres, ellipsoids, rods, and the like. The beads of the invention can be used in various convenient ways, to make contact with a flowing aqueous stream. For example the beads can be retained within a vessel, tank, or other enclosure and be used in the form of a fixed bed, a fluidized bed or the like. These bioreactors can be operated in various conventional ways, as for example, continuous flow, recycle batch, continuous flow with recycle, etc. Biocatalyst located within the beads is protected from shear forces generated by the flowing aqueous stream and is not swept away by the stream.

The activated carbon powder in the polymer of the porous beads provides the beads with a high adsorbent capacity. The biocatalyst within the macropores of the beads causes the beads to be biologically active as well. Thus the beads of the invention can readily capture adsorbable contaminants from an aqueous streams. The biocatalyst located within the macropores of the polymeric beads serves to metabolize contaminants adsorbed by the activated carbon of the beads and convert the contaminant into harmless products. For example, organic contaminants that are adsorbed from aqueous streams can be converted by the biocatalyst into oxygen, water, and/or nitrogen. As a result the consumption and metabolizing by the biocatalyst of the contaminant that was adsorbed on the carbon surfaces, the adsorbent capacity of the bead is constantly renewed.

The porous adsorbent polymeric beads of the invention have macropores of a mean pore diameter that is sufficiently large to permit bacteria to colonize through the entire internal porous volume. In contrast, some of the other methods of immobilizing bacteria only allow for the attachment of bacteria to the surface of materials.

A preferred method for preparing adsorbent porous beads suitable for use in the present invention is as follows. Powdered activated carbon is added to a solution of polymer in solvent (e.g., poly(m-phenylene isophthalamide in dimethylacetamide) to form a slurry of activated powder in the polymer solution. Polymer concentration in the solution can be within a fairly wide range (e.g., 5 to 20%). Typically, the activated carbon powder in the slurry amounts to 2.3 to 7 times the total weight of the polymer. The slurry is then mixed thoroughly. Droplets of the slurry are allowed to fall through a non-coagulating zone (e.g., air) of 1 to 20 inches in length (5 to 45 cm) into a coagulating bath (e.g., water), wherein solvent is removed from the droplet and the droplet becomes a porous adsorbent bead. The beads can be separated from the water by a simple decantation process. The beads can then be washed to remove residual solvent. Beads formed by this method typically are between 0.5 to 5 millimeters in diameter, however, it is possible to form larger beads by this method. Depending on the height of the non-coagulating zone and the viscosity of the droplets, among other things, the resultant beads can have the forms of spheres, flattened spheres, discs, etc. Rods of various lengths and shapes also can be formed by changing the rate at which the slurry is passed through the orifice. The size and volume of the pores that are formed in preferred polymers is usually controlled by the concentration of the solvent in the polymer stream and the shape and size of the beads that are formed depends on the concentration, the size of the droplets and the distance thorough which the droplets fall through air before entering the liquid coagulating bath.

Any polymer that is capable of (a) having activated carbon powder thoroughly distributed within it and (b) forming beads having the microporous and macroporous structure described above (i.e., BET specific surface of at least 400 m2/gram and a mercury intrusion volume in the range of 1.8 to 2.5 cm3/gram) is suitable for use in the present invention. Generally, preferred polymers are those that can be formed from solutions by passing the solution from an orifice through an air gap into a coagulating bath as described in the preceding paragraph. Particularly preferred for the bead are poly(m-phenylene isophthalamide) and copolymers thereof, and a polymer or copolymer formed from terephthalic acid ("TPA"), isophthalic acid ("IPA"), m-phenylene diamine ("MDA") and 2,4-diaminobenzene sulfonic acid ("DABSA"), for example, 15 mole % TPA, 35% IPA, 49–45% MDA and 5–10% DABSA.

The beads made by the above-described preferred process can contain water within their macropores. Such can be used directly in bioreactors by inoculating the beads with biocatalyst and providing a suitable environment for the cultivation of the biocatalyst microorganisms. Alternatively, the beads can be dried to remove contained water. Dry beads are desirable for reducing the shipping weight of the beads and for preventing unwanted colonization of the beads by molds, fungi, or other microorganisms.

The following test procedures were used to measure the characteristics and properties of the porous adsorbent biocatalytic beads reportd in the preceding discussion and in the following examples.

A JEOL 840 Scanning Electron Microscope was used for obtaining the photograph of the bead cross-section appearing in the drawing.

Specific surface area in square meters per gram of the beads is determined from nitrogen adsorption measurements in accordance with the general method of Brunnauer, Emmett and Teller (BET). The measurements are made with a Model 2100 Surface Area and Pore Volume Analyzer sold by Micromeritics Instruments Corp. of Norcross, Ga. The test samples are conditioned for about 10 hours under a vacuum of about 0.025 mm of mercury while at a temperature of about 120° C.

Mercury porosimetry, a technique described in "Adsoprtion, Surface Area and Porosity" 2nd Ed Academic Press (1982) pp. 173–190, is used to determine the total intrusion volume (cm3/gram). The technique is also useful for determining total pore area and average pore size, and pore size distribution within the beads.

EXAMPLES

In each of the examples, the following general procedures were employed to prepare adsorbent beads of polymer containing activated carbon powder and for inoculating the beads with biocatalyst. Although the invention is illustrated with only one type of polymer, poly(m-phenylene isophthalamide), other polymers are also suitable for the beads of the invention.

Bead Preparation

Porous adsorbent beads of the invention for use in each of the Examples were prepared as follows. A solution of 340 grams of poly(m-phenylene isophthalamide) in 4,517 grams of N,N-dimethylacetamide ("DMAc") was prepared. An addition of 1,022 grams of activated carbon powder (PCB-G grade, obtained from Calgon Carbon Co. of Pittsburgh, Pa.) was made to the solution. The resultant mix was stirred thoroughly until a smooth homogeneous slurry was obtained. The slurry was then fed by gravity flow, at a rate of 227 grams per hour, through a parallel array of ten medicine droppers (bought from Fisher Scientific of Lexington, Mass.), each dropper being 3-in (7.2 cm) long and having a 2-mm diameter opening in its tip. Droplets which formed at the end of each dropper, separated from the dropper, fell through air for a distance of 3 inches (7.2-cm) into a bath of cold, lightly agitated water, in which the beads coagulated. The beads, which were roughly spherical in shape, were collected on a Buchner funnel and then washed continuously with water for several hours to remove substantially all of traces of DMAc.

Some of the thusly prepared beads were dried in a convection oven in which air at 160° C. was circulated. The dried beads had a microporous specific surface area of 608 m2/g (measured by BET method) and a mercury intrusion volume of 2.3 cm$^3$/g. The diameters of the beads were in the range of 2 to 4 mm and had a bulk density of about 0.23 g/cm$^3$.

EXAMPLE 1

This example illustrates the preparation of a typical buffered solution of bacterial inoculum and its incorporation into beads of the invention.

The bacterial inoculum was prepared as follows. A solution of brine and phenolics, obtained by extracting acidic impurities in untreated gasoline with a solution sodium hydroxide, was collected from a refinery gasoline scrubber. The caustic solution was neutralized with a mixture of nitric and phosphoric acids. The resulting organic phase was decanted from the brine. The aqueous phenolic brine layer contained 0.5% to 1.7% phenolics and about 5% to 20% $NaNO_3$, as determined by a standard colorimetric assay (e.g., the 4-amino-antipyrine method, "Water Analysis Handbook", Hack Co., Loveland, Colo, 1989).

Two gallons (7.6 liters) of bacterial inoculum was obtained from the anaerobic digester of a municipal wastewater treatment plant. This sludge was acclimated to the phenolic brine by adding the brine to the sludge at a dose of approximately 110 ppm phenolics and 1000 ppm $NaNO_3$ each day for three weeks.

A total of 500 mL of the acclimated sludge was mixed with a buffer solution consisting of 10 Liters of deionized water, 5 grams of $K_2HPO_4$, 0.5 gram of $KH_2PO_4$, 1 gram of $NH_4H_2PO_4$, 5 grams of $NaHCO_3$ and 20 grams of $KNO_3$.

Beads prepared as described above and weighing 422 grams were placed in a jacketed glass tube of 8.5-cm diameter and 45-cm length, equipped with an exit port on the bottom and a pressure transducer and relief valve in the headspace. The beads were retained in the tube with stainless steel screens on top and bottom of the packed bed.

A 100-mL volume of the phenolic brine was added to the bacterial inoculum solution and then circulated at a rate of 200 mL/min through the beads. A pressure increase was observed, indicating that nitrogen and carbon dioxide were being generated and bacterial metabolism of phenol was occurring. After three weeks the beads were removed from the glass tube and rinsed with tap water to remove any particles and bacteria which were not immobilized within the beads.

EXAMPLE 2

This example demonstrates the bio-activity of inoculated beads and the bio-regeneration of the adsorptivity of the beads.

Inoculated beads of Example 1 were placed in the glass tube apparatus described in Example 1. The adsorption capacity of the beads was first saturated by treating the beads with recirculating water to which several 100 to 500 mL doses of phenolic brine were added. The concentration of total phenolics in the water amounted to 0.5%–1.7%. Saturation of adsorption capacity was determined as the point at which the phenol concentration in the circulating solution did not change significantly with time.

The recirculating solution was then replaced with the buffer solution of Example 1. After circulating for one day, the concentration of phenol in the buffer solution reached 116 ppm, indicating desorption of phenol from the beads. Potassium nitrate was added to the recirculating buffer solution to maintain a concentration of at least 1000 mg/L of $KNO_3$. After two weeks the concentration of phenol in the circulating solution dropped to 19 mg/L and the amount of $KNO_3$ consumed was 110 g. This result demonstrated bioactivity of the inoculated beads and showed that about 19 g of phenol were bio-degraded to carbon dioxide, nitrogen, and water in accordance with the following equation:

$$C_6H_5OH + 5.6\ HNO_3 = 6\ CO_2 + 2.8\ N_2 + 5.8\ H_2O$$

To show that the adsorptive capacity of the beads had been bioregenerated, 100 mL of phenolic brine was added to the recirculating solution (which amounted to about 10 L). Within one hour, the concentration of phenolics in the recirculating solution was reduced from about 100 ppm to 4 ppm. The primary cause of the rapid reduction was the adsorption of phenolics to the composite beads.

EXAMPLE 3

This example demonstrates the use of inoculated beads to biocatalytically remediate water contaminated with gasoline hydrocarbons.

The apparatus and beads containing nitrate reducing bacteria from examples 1 and 2 were used in this example. The inoculated beads were conditioned by recirculating 10 L of the buffer solution of Example 1 through the beads for 24 hours.

Seven liters of "tank bottom water" containing dissolved hydrocarbons were obtained from the bottom of a gasoline storage tank. The tank bottom water was diluted with 3 liters of deionized water containing 5 grams of $K_2HPO_4$, 0.5 gram of $KH_2PO_4$, 1 gram of $NH_4H_2PO_4$, 5 grams of $NaHCO_3$ and 80 grams of $KNO_3$. The Chemical Oxygen Demand (COD) of the resulting solution was determined by the Dichromate Reflux Method described in "Water Analysis Handbook", Hack Co., Loveland Colo., (1989) to be 66,000 mg/L. This solution was recirculated through the inoculated beads with the following results:

| Day | COD | Nitrate (mg/L) |
|---|---|---|
| 1 | 66,000 | 4100 |
| 2 | 56,700 | 1760 (added 100 g of $NaNO_3$) |
| 5 | 51,700 | 2464 |
| 8 | 48,250 | 1804 |
| 12 | 40,550 | 4884 |

The results show a continual reduction of COD with time. Over the period of 12 days the COD was reduced by over 39%. This indicates that the hydrocarbons in the tank bottom water are being biocatalytically oxidized by the bacteria immobilized in the adsorbent composite beads.

EXAMPLE 4

This example demonstrates the ability of the adsorbent beads of the invention to biocatalytically remove trace concentrations from an aqueous stream in a single pass.

Two columns were used. Column A was maintained in an abiotic state by continuously infusing a solution of sodium azide and mercuric chloride to keep the system sterile. Column B was inoculated with aerobic bacteria obtained from a refinery wastewater treatment system. The columns consisted of 1-inch (2.5-cm) diameter by 30-inches (76-cm) high glass tubes. The beads were retained on the bottom with a screen. The columns were packed to a height of 20 inches (51 cm) with the beads. A buffer solution containing 25 mg/l of $NaH_2PO_4$, 42 mg/mL of $NaH_2PO_4$, 7.5 mg/L of $NH_4Cl$, 100 mg/L of $NaNO_3$, 1 mg/L of yeast extract and 10 mg/L of phenol was passed through the columns at a flow of 15 mL/min to provide a bed contact time of 17 minutes and a residence time in the packed bed of about 8 minutes. Mercuric chloride was injected into column A at a concentration of 25 mg/L and the sodium azide was injected at a concentration of 250 mg/L. Hydrogen peroxide was injected into the buffer feed solution at a rate to maintain greater than 8 ppm dissolved oxygen in the effluent stream from the columns.

After running for approximately three days, the effluent concentration of phenol from the columns was equal to the input concentration (10 ppm). This indicated that the adsorption capacity of the beads had been reached. Solution containing about 10 ppm of phenol was then fed to the columns for 70 days with the following results:

| Day | Effluent ppm of phenol | |
|---|---|---|
| | Col A | Col B |
| 1 | 10 | 9.5 |
| 10 | 10 | 9.5 |
| 20 | 10 | 8.0 |
| 30 | 10 | 8.0 |
| 40 | 10 | 5.5 |
| 50 | 10 | 4.0 |
| 60 | 10 | 3.5 |
| 70 | 10 | 0 |

The results show that as the bio-mass grew with time, the efficiency of Column B became greater until after 70 days sufficient bio-mass existed to totally oxidize the phenol stream in one pass (8 minutes).

EXAMPLE 5

This example demonstrates the utility of the bioreactor of this invention to remediate, in a single pass, a lean ground water stream from a former gasoline station. The ground water at the field site contained between 200 to 400 parts per billion (ppb) total benzene, toluene, ethylbenzene, and xylenes (BTEX), as determined by gas chromatography.

The bioreactor consisted of a 55-gal tank equipped with an inlet and outlet and packed with about 50 gallons of the adsorbent composite beads. The beads were inoculated with activated sludge from a refinery waste water treatment system. Bio-mass was grown in the beads before deployment at the former gasoline station site by feeding the inoculated beads with an oxygenated stream of BTEX (100 ppm) over a period of about 3 weeks.

The ground water was injected with oxygen and pumped through the bioreactor beads at about 1 to 2 gallons per minute (gpm). The following results were obtained:

| | BTEX (ppb) | |
|---|---|---|
| Day | Inlet | Outlet |
| 2 | 200 | ND (Non-detectable, <3 ppb) |
| 24 | 254 | ND |
| 31 | 345 | ND |
| 38 | 431 | ND |
| 45 | 394 | ND |
| 52 | 331 | ND |
| 66 | 291 | ND |
| 80 | 251 | ND |
| 108 | 200 | ND |

After one hundred and eight days of successful operation the reactor was voluntarily shut down. The organic contaminants BTEX were reduced to substantially zero in one pass through the bioreactor.

We claim:

1. An improved bioreactor in which bacterial biocatalyst material is supported within porous synthetic organic polymeric beads and activated carbon powder being dispersed throughout the polymer of the beads, wherein the improvement comprises:

forming the porous polymeric bead from an aramid polymer, the bead having a microporosity characterized by a BET specific surface area of at least 400 m2/g and macropores characterized by a mercury intrusion volume in the range of 1.8 to 2.5 cubic centimeters per gram and locating the living biocatalyst material within the macropores of the beads such that the living biocatalyst material regenerates the adsorptive capacity of the actived carbon.

2. An improved bioreactor in accordance with claim 1, wherein the activated carbon powder amounts to 2.3 to 7 times the weight of the polymer.

3. An improved bioreactor in accordance with claim 1, wherein the microporosity BET specific surface area is in the range of 600 to 1600 $m^2/g$.

4. An improved bioreactor in accordance with claim 1, wherein the aramid polymer of the bead is selected from poly(m-phenylene isophthalamide) and copolymers thereof, and a polymer or copolymer formed from m-phenylene diamine and an acid selected from the group consisting of terephthalic acid, isophthalic acid and 2,4-diaminobenzene sulfonic acid.

5. A process for detoxification of an aqueous waste stream containing an organic chemical contaminant, comprising the steps of passing the waste stream through, a bioreactor in which bacterial biocatalyst material is supported within porous synthetic organic polymeric beads and activated carbon powder is dispersed throughout the polymer of the beads, wherein the beads are formed from an aramid polymer and have a microporosity characterized by a BET specific surface area of at least 400 $m^2/g$ amd macropores characterized by a mercury intrusion volume in the range of 1.8 to 2.5 cubic centimeters per gram adsorbing the organic contaminant onto the activated carbon powder particles of the bioreactor bead, bacteria located in the macropores of the bead being the biocatalyst metabolizing the adsorbed chemical contaminant to water, carbon dioxide and/or nitrogen and thereby regenerating adsorbent capacity of the carbon powder, and discharging from the bioreactor an aqueous stream that is substantially free of the contaminant.

6. A process in accordance with claim 5, wherein the waste stream contains phenol that is decreased from its initial concentration to a concentration of less than 5 ppm by passage through the bioreactor.

7. A process in accordance with claim 5 wherein the waste stream contains organic contaminants comprising 200–400 parts per billion (total) of benzene, toluene, ethylbenzene and xylenes, which contaminants are decreased to less than 3 parts per billion.

* * * * *